United States Patent [19]

Hudson et al.

[11] Patent Number: 5,466,274
[45] Date of Patent: * Nov. 14, 1995

[54] ABRASION RESISTANT COATINGS FOR FERTILIZERS

[75] Inventors: Alice P. Hudson, Jupiter; Fred E. Woodward, deceased, late of West Palm Beach, both of Fla.; by Sam Woodward, executor, Westfield, N.J.; Richard J. Timmons; Harvey M. Goertz, both of Marysville, Ohio

[73] Assignee: OMS Investments, Inc., Wilmington, Del.

[*] Notice: The portion of the term of this patent subsequent to Apr. 5, 2011, has been disclaimed.

[21] Appl. No.: 222,669

[22] Filed: Apr. 4, 1994

Related U.S. Application Data

[63] Continuation-in-part of Ser. No. 74,141, Jun. 9, 1993, Pat. No. 5,300,135, which is a continuation of Ser. No. 655,157, Feb. 14, 1991, abandoned.

[51] Int. Cl.⁶ .................. C05C 9/00; C05G 3/10
[52] U.S. Cl. .................. 71/28; 71/29; 71/30; 71/64.07; 71/64.11; 71/64.13; 71/33; 71/63
[58] Field of Search .................. 71/28–30, 64.07, 71/64.11, 64.13, 33, 63

[56] References Cited

U.S. PATENT DOCUMENTS

| 3,192,031 | 6/1965 | Zaayenga | 71/28 |
| 3,372,019 | 3/1968 | Fox | 71/64.07 |
| 5,147,442 | 9/1992 | Kosuge et al. | 71/64.07 |
| 5,300,135 | 4/1994 | Hudson et al. | 71/64.07 |

Primary Examiner—Ferris Lander
Attorney, Agent, or Firm—Jones, Day, Reavis & Pogue

[57] ABSTRACT

Polymer topcoated sulfur coated fertilizer compositions are provided which exhibit slow release characteristics and are abrasion resistant, free flowing, non-smearing and essentially dustless products.

14 Claims, No Drawings

ABRASION RESISTANT COATINGS FOR FERTILIZERS

CROSS REFERENCE TO RELATED APPLICATIONS

This is a continuation-in-part of application Ser. No. 08/074,141, filed Jun. 9, 1993, now U.S. Pat. No. 5,300,135, Apr. 5, 1994 which was a continuation of application Ser. No. 07/655,157, filed Feb. 14, 1991, now abandoned.

BACKGROUND OF THE INVENTION

1. Field of the Invention

This invention relates to polymer topcoated, sulfur coated fertilizer granules or prills which are abrasion resistant, free flowing, non-smearing, essentially dustless fertilizer compositions having enhanced slow release characteristics.

2. Description of the Prior Art

The process for sulfur coating of fertilizer granules or prills was developed in 1968 by the Tennessee Valley Authority (TVA) in Muscle Shoals, Ala., as an economical system for reducing the rate of dissolution of urea particles when they are applied to the soil as fertilizer. U.S. Pat. No. 3,342,577 describes this sulfur coating process and also the sealant material that was necessary to fill in holes, cracks or imperfections that result naturally in the sulfur coating as it cools. The TVA process is also described in Sulphur Inst. J. 4(3) 2-6 (1968), ibid. 8(4) 2-5 (1972a) and ibid. 8(4) 6-8 (1972b). The TVA recommendation for the sealant is a mixture of 30% polyethylene resin in 70% bright stock mineral oil.

The process is further described in *Sulfur Coating of Urea Treated with Atapulgite Clay*, Gullett, G. L.; Simmons, C. L.; and Lee, R. G.; presented at the 198th American Chemical Society meeting in Miami Beach, Fla., in September 1989.

The requirement for a sealant for sulfur coated urea (SCU) has been documented by McClellan and Scheib (Sulphur Inst. J. 9(3/4) 8-12 (1973)), and by Scheib and McClellan ibid. 12(1) 2-5 (1976).

A description of slow release urea and NPK fertilizers is given in Hort. Rev. 1 79-140 (1979).

Paraffin waxes have been used to produce relatively slow dissolving clathrate complexes with urea by processes which do not relate to coating urea or other fertilizer granules or prills, but instead involve a solution or dispersion of urea in paraffin, as described in U.S. Pat. No. 3,252,786.

Paraffin alone has not been used as a slow release coating for fertilizers such as urea because of its lack of adhesion. Also, paraffin has not been used as a coating for sulfur coated fertilizers such as SCU for the same reason and, also, because the coating is rubbed off or otherwise cracked or abraded when the sulfur coated fertilizer prills or granules are handled in high speed bulk moving equipment wherein large amounts of product are moved by hopper car or by truck and off-loaded into storage bins. The wax-oil sealants as described by TVA publications and currently being applied to SCU require the addition of a clay conditioning agent at levels nearly equal to that of the wax sealant to prevent caking and provide a free flowing product. A typical process may require 3% of the wax-oil sealant and 2% of the clay conditioning agent on the weight of the SCU, or 67% clay on the weight of the sealant. This requires large scale clay handling equipment in addition to the equipment necessary to apply the molten sulfur and wax sealant.

When the clay conditioned SCU is applied in the field by mechanical spreaders, the clay or wax-clay mixtures tend to be removed from the SCU particles by the abrasive action of the screw conveyors and the mechanical spreading wheel, resulting in a build-up of wax-clay on various parts of the machine and requiring frequent shut-downs for cleaning.

An additional problem with SCU from current production methods is the reduction or loss in WIN which occurs on shipping the SCU from the production point to the local blending point. This loss is exacerbated by the further abrasion which occurs in the blending and bagging operations. When they are mixed and bagged, urea and blended fertilizers containing slow or controlled release nutrients must be labelled with their WIN content, and it is the responsibility of the manufacturer to assure that the value does not decrease below the labeled value during shipping and storage. Thus a significant loss in WIN resulting from handling in modern high-speed equipment can create a situation in which the fertilizer is mislabeled and subject to recall.

U.S. Pat. No. 3,372,019 describes wax/resin coated fertilizer compositions wherein the wax/resin coating composition is applied directly onto the surface of a fertilizer substrate and not onto sulfur coated fertilizer substrates.

U.S. Pat. No. 4,881,963 describes polymer coated fertilizers wherein the polymer coating includes an ethylene—carbon monoxide copolymer as an indispensable component. The coating may also contain another resin including rubbery resins such as natural rubber, polyisoprene, polybutadiene and the like or an ethylene—vinyl acetate copolymer. However, again, the polymer coatings are not applied over primary sulfur coated fertilizers.

U.S. Pat. Nos. 4,042,366 and 4,676,821 teach the use of standard TVA-type coatings applied over sulfur coated particulate cores. In both of these patents, the topcoat is relatively soft and flowable at ambient temperatures so that the material acts as a sealant to fill voids, cracks or imperfections inherent in the surface of the sulfur layer. These patents do not describe the use of non-flowable topcoats over the sulfur coating. Furthermore, these compositions require the application of dust-like conditioning agents in or over the sealant layer.

U.S. Pat. No. 3,576,613 describes sulfur coated fertilizer product consisting of: (a) an inner core comprising a solid fertilizer pellet; (b) a subcoating layer immediately adjacent to and surrounding the inner core fertilizer pellet; and (c) a coating of elemental sulfur substantially completely encapsulating the subcoated fertilizer pellet. The subcoating layer interposed between the fertilizer core and the sulfur coating is required to achieve the desired results and comprises a finely divided powder such as charcoal or carbon black capable of reducing the contact angle between the surfaces of the underlying fertilizer pellet and the outer sulfur coating.

U.S. Pat. No. 3,903,333 describes a method for producing slow-release fertilizers coated solely with sulfur and the intent of the invention is to eliminate the need for a secondary coating or sealant application over the primary sulfur coat.

SUMMARY OF THE INVENTION

It is a principal object of the present invention to provide abrasion or attrition resistant, free flowing, non-smearing, essentially dustless polymer topcoated sulfur coated fertilizer compositions having enhanced slow release characteristics.

Another object of this invention is to provide coatings for sulfur coated fertilizers and other plant nutrients which will act to give the topcoated sulfur coated fertilizer granules or prills high water insoluble nitrogen (WIN) values and, thus, provide fertilizer prills or granules which will release the substrate plant nutrients to the soil at a slow uniform rate over an extended period of time.

A further object of this invention is to provide coatings for sulfur coated fertilizer which can be readily applied to the sulfur coated particles in a molten form, and provides sealed sulfur coated fertilizer products which become non-tacky and free flowing on cooling to ambient temperature and, therefore, do not require large amounts of clay or other conditioning agent and minimize the build-up of deposits in field application equipment.

A still further object of this invention is to provide polymeric coatings for sulfur coated fertilizers which provide high WIN values which are not significantly decreased by the abrasion encountered in shipping, mixing, bagging, and storage.

Specifically, we have discovered that fertilizer prills or granules coated with sulfur in accordance with the methods developed by the TVA, and subsequently coated with particular hydrocarbon wax-polymer composites provide abrasion resistant fertilizers or fertilizer components with slow release rates of soluble nitrogen into the soil.

The wax-polymer composites are prepared by mixing certain polymers which have a carbon backbone and oxygen containing polar groups in their side chains with certain hydrocarbon waxes.

A wide variety of forms of fertilizer granules, prills or other particles can be employed as substrates for the slow-release compositions of this invention. For example, the particles may be crystalline, granular, in flake form, plus pellets, etc. In general, forms that are substantially spherical in shape will be easier to coat. The preferred size of particles are those that will pass through a 4 mesh screen, but will not pass through a 20 mesh, The plant nutrients that are employed as substrates herein will in general be composed of nitrogen, phosphorous, or potassium; but may include other minor constituent materials. Examples of fertilizers which may be so employed include ammonium sulfate, ammonium phosphate, urea, super-phosphate, dicalcium phosphate, basic calcium phosphate, potassium sulfate, potassium phosphate, potassium chloride, magnesium oxide and magnesium sulfate. Also, various blends of these compounds may be used, for example, the mixed fertilizers which are in wide commercial use may also be coated.

Particularly preferred polymers for use herein are ethylene-vinyl acetate copolymers in which the weight ratio of ethylene to vinyl acetate is most preferably from about 20 to about 2, and the number molecular weight is from about 2000 to 20,000; and ethylene-acrylic acid copolymers including ethylene acrylic acid zinc ionomers in which the weight ratio of ethylene to acrylic acid is most preferably from about 50 to about 10, and the number molecular weight is from about 2000 to 20,000.

Examples of other resins which may be suitably employed are copolymers of ethylene with ethyl acrylate; copolymers of ethylene with vinyl alcohol and terpolymers of ethylene vinyl alcohol-vinyl acetate.

Particularly preferred hydrocarbon waxes for use herein are natural petroleum or mineral waxes containing less than about 5% oil which have melting points between about 60° and 80° C. and are essentially free of aromatic and cyclic structures; and synthetic hydrocarbon waxes which melt between about 60° C. and 105° C.

Examples of waxes suitable for use in the coatings of this invention are paraffin waxes and microcrystalline waxes. Paraffin wax is defined as a solid, crystalline, hydrocarbon mixture wholly derived from that portion of crude petroleum commonly designated petroleum distillate; or from hydrocarbon synthesis by low temperature solidification and expression are by solvent extraction. It is solid at room temperature, and deforms at this temperature only relatively slightly, even under considerable pressure, and has a low viscosity (35–45 SSU) at 200° F. when melted. Microcrystalline waxes have molecular weights of from 400–700 and average molecules of 40 to 50 carbon atoms. They contain a large proportion of side chains and a sizable number of cyclic hydrocarbon units.

In accordance with the present invention, the wax-polymer coating compositions are applied to the sulfur coated fertilizer granules or prills at levels from about 0.75% to about 10%.

DETAILED DESCRIPTION

We have discovered attrition or abrasion resistant, non-blocking or free flowing, non-smearing and essentially dust free sulfur coated fertilizers which have polymeric topcoats prepared by mixing about 5 to about 50% of a hydrocarbon soluble polymer with a hydrocarbon wax. The preferred polymers are selected from a group of resinous products which provide tack and adhesion to hot melt adhesives. Thus, it is surprising and unexpected that such products provide non-blocking properties in the present application.

The polymers and copolymers of the invention are soluble over a wide range of proportions in paraffinic hydrocarbons and the resulting composites have melting points of less than about 105° C., preferably less than 90° C., and most preferably from about 60° C. to 85° C.

Suitable ethylene-vinyl acetate copolymers for use herein are produced and marketed by a number of manufacturers. Products useful in the present invention include ELVAX Resins produced by DuPont, A-C 400 series of resins produced by Allied Corporation, ESCORENE Resins produced by Exxon Chemical Company, ELVACE Resins produced by Reichhold Chemicals, Inc., and EVA copolymers produced by Union Carbide Chemicals and Plastics Company Inc. The vinyl acetate content is from about 5% to about 30% by weight of the copolymer. If less than 5% vinyl acetate is present, the copolymer does not significantly improve the adhesion properties of the final sealant coating, and if more than 30% vinyl acetate is present the resulting copolymer is not compatible with the hydrocarbon wax portion of the sealant.

The molecular weight of the copolymers should be such that the viscosities of the molten copolymer-hydrocarbon wax mixtures are sufficiently low as to be easily applied by flowing over the sulfur coated fertilizers or may be applied through nozzles.

Suitable ethylene acrylic copolymers for use herein are produced by Allied-Signal Inc. and sold under the trade names A-C 540, A-C 580, and A-C 5120, and by Dow Chemical Company under the trade name PRIMACOR. In the copolymers useful in the present invention the acrylic acid comprises a maximum of about 10% by weight of the copolymer. Copolymers with a higher acrylic acid content are not compatible with the hydrocarbon wax materials.

Suitable ethylene-ethyl acrylate copolymers for use herein are produced by Union Carbide Chemicals and Plastics Company Inc. and sold under the trade name DPDA 9169. Suitable ethylene vinyl alcohol, vinyl acetate terpolymers for use herein are produced by Allied-Signal Inc. and sold under the trade name ACTOL 70.

The polymers are modified by the addition of sufficient hydrocarbon wax materials so that their melting or softening point is from about 40° C. to about 110° C., and preferably from about 60° to 100° C., and most preferably from about 65° C. to 85° C. Suitable hydrocarbon wax materials include petroleum or mineral waxes having a range of melting points from about 38° C. to about 80° C. The waxes also contain varying amounts of oil, which is arbitrarily defined as that portion of the wax which is soluble in methyl ethyl ketone at 31.7° C. (ASTM method D721). The waxes are produced from crude oils by a variety of refining methods and their compositions and physical properties are a continuum and can only be defined specifically by the refining method used for isolating the wax from oil from a specific oil field.

Preferred petroleum waxes are characterized by having a drop melt point of 60° C. or higher; and by having an oil content of less than about 15%, preferably less than about 5% and most preferably less than about 0.5%; and by being essentially free of aromatic or cyclic hydrocarbons. They form larger more regular crystals when cooling from the melt, which gives them good moisture vapor barrier properties but also makes them brittle.

Examples of suitable petroleum waxes include microcrystalline waxes which typically have an oil content of 5 to 15%, slack waxes which typically have an oil content of 5 to 15%, scale waxes which typically have an oil content of 2 to 5%, paraffin waxes which typically have an oil content of 1 to 2%, and fully refined paraffin waxes which typically have an oil content of less than about 1.5%.

Other suitable hydrocarbon waxes for use herein are synthetic waxes, including polyethylene waxes represented by a product produced by Chevron Chemical Company and marketed under the trade name Gulftene C30+. This is a synthetic wax made by the polymerization of ethylene. The process for the production of this type of alpha olefin synthetic wax normally is designed to maximize the degree of polymerization at about 10 to 18 carbon atoms although longer carbon chains may be produced. The waxes useful in our coatings are the residues from removing most of the polyethylenes up to about 28 carbons. A typical composition for this wax is described by the size of the hydrocarbon wax molecules and the position of the olefin moiety. Waxes useful in this invention have 3 to 20% $C_{24-28}$ hydrocarbons, 60 to 95% $C_{30-56}$ hydrocarbons, and 0 to 20% $C_{56}$ and higher hydrocarbons. They consist of 0.5 to 2% paraffins (with no unsaturation), 30–40% hydrocarbons with vinylidine double bonds, 8–12% hydrocarbons with internal double bonds, and 50–55% hydrocarbons with alpha double bonds. The drop melt point is about 71° C.

Another suitable synthetic wax is Polywax 500 manufactured by Petrolite. It is a polyethylene with an average molecular weight of 500, a drop point of 86° C., and viscosity at 149° C. of 3 centipoise.

The waxes described above differ from polyethylenes such as the products produced by Allied Corporation and sold under the trade names A-C6 and A-C1702, for example. The hydrocarbon waxes of this invention have average molecular weights in the range of 400 to 600, and form large crystalline regions on melting and cooling. The polyethylenes as represented by A-C6 and A-C1702 have average molecular weights of about 2000 and 1600, drop melting points of 106° C. and 92° C. respectively, and are largely amorphous. They are produced by a substantially different manufacturing process.

Hydrocarbon wax materials as described herein are preferred for use in producing the topcoatings of the present invention. Wax materials represented by the composition of Gulftene C30+ are most preferred.

The solid composite materials at room temperature have densities greater than about 0.915 g/cc.

The composites are further characterized by being non-blocking as films on a substrate of sulfur at 42° C. when tested by the following method: A 10 g sample of SCU to which a sealant composition has been applied is placed in an aluminum dish, and a 100 g weight is placed on top of the urea sample. The weighted urea sample is placed in an oven at 42° C. After 30 minutes, the weighted sample is removed from the oven and allowed to equilibrate to room temperature. The weight is removed, and the degree to which the topcoated sulfur coated fertilizer particles adhere to each other is evaluated. Sulfur coated fertilizers topcoated with the compositions of this invention do not adhere to each other by this test and thus will remain free-flowing after storage in bags or in storage bins at 42° C.

The composites of this invention are further characterized by having a high specific adhesion coefficient for solid sulfur. Thus, a drop of the composites in molten form placed on a heated surface of solid sulfur will spread spontaneously and the leading edge of the spreading film will have an angle of less than 45 degrees and preferably less than 15 degrees.

Other minor adjuvants commonly added to wax barrier coatings, such as antioxidants and microbicides, which are known to those skilled in the art, may be advantageously incorporated into the compositions of this invention.

Another aspect of this invention is the provision of a process for topcoating sulfur coated fertilizer particles or other fertilizer particles with the compositions of this invention. The process is dependent on the absence of volatile components in the compositions; the tendency of the compositions to spread spontaneously on the surface of the fertilizer particles, and thus give a coating free of voids and pin holes; and the relatively low viscosity of the molten compositions which allows them to be sprayed or otherwise metered onto the fertilizer particles.

The process in its essential part involves contacting the topcoating compositions with the sulfur coated fertilizer granules at a temperature above the melting point of the topcoating composition with sufficient agitation to allow for a uniform coating, and cooling with continuous agitation to ambient temperature.

A preferred process is to place the sulfur coated fertilizer particles in a pan granulator, rotating drum, or other suitable mixing device for solid particles, warm the particles to about 70° C. to 100° C., preferably, to about 78° to 88° C., and introduce the topcoating composition either in the form of a spray or liquid stream or pellets or prills of about 0.5 to 2mm in diameter may be employed which melt immediately on contacting the heated sulfur coated fertilizer granules. The sulfur coated fertilizer is cooled in a rotating drum or in a fluid bed cooler, and becomes free flowing without the aid of a clay or other conditioning agent.

The following examples are provided to illustrate preferred sulfur coated fertilizer compositions, the preferred method of preparation, and comparative evaluations with prior art compositions. In these examples and throughout the remainder of this disclosure, all percentages are by weight based on the total weight of all components in the described compositions.

EXAMPLE 1

75 g of Gulftene C30+ and 25 g of ELVAX 420 (18% vinyl acetate) were combined and warmed with stirring to 180° C., and stirred at this temperature for 30 minutes. The resulting mixture had a viscosity of 300 to 340 centipoise at 125° C., and a melting point of 75° C.

100 g of sulfur coated urea granules (1–2 mm diameter) were placed in a heated pan and warmed to 75° C. 2.0 g of the GulfteneElvax mixture melted at 80° C. was added in a thin stream while the SCU particles were stirred. The topcoating composition spread spontaneously to a uniform coating of molten wax on the urea. Mixing was continued for about 1 minute. The pan was removed from the heat source and stirring continued until the coated urea had reached a temperature below 45° C., at which point the particles were free flowing.

EXAMPLE 2

By the same procedure as in Example 1 the following compositions were prepared and applied to SCU:

A. 25% ELVAX 265 (28% vinyl acetate), 75% Gulftene C30+
B. 10% ELVAX 265, 90% Gulftene C30+
C. 25% ELVAX 265, 75% paraffin wax, mp 65° C.
D. 25% ELVAX 420, 75% paraffin wax, mp 65° C.
E. 25% ELVAX 420, 75% slack wax
F. 25% A-C 400A (13% vinyl acetate), 75% Gulftene C30+
G. 5% A-C 540A (5% acrylic acid), 94% Gulftene C30+
H. 38% A-C 540A, 62% Gulftene C30+

EXAMPLE 3

A TVA recommended composition was prepared by mixing 70 g of Shellflex 790, which is a hydrotreated solvent extracted paraffinic oil, equivalent to HVI-150 Britestock (sp. gr. 0.905, mw 600–650, viscosity 30–35 SSU at 100° C.) and 30 g of A-C6 polyethylene (drop point 106° C.). It was applied at 3% to SCU granules. The resulting particles were extremely tacky and required 2 g of diatomaceous earth to render them free flowing.

EXAMPLE 4

The abrasion resistance of the SCU to which coatings had been applied was tested by the following procedure:

A 90 g sample of coated SCU was placed in a glass jar (9 cm diameter×16.7 cm height) and the jar was capped. The jar was turned on its side and shaken vigorously in an up and down motion, with particles hitting the sides of the jar, for 30 seconds. The amount of dust (yellow sulfur particles) and wax deposited on the jar was evaluated. The coated urea particles which had been abraded in this manner were then tested for WIN as described below and the results compared with a sample of the product which had not been abraded.

To determine water insoluble nitrogen (WIN), 10 g of the coated SCU to be tested and 90 g of distilled water were placed in a polyethylene bottle and swirled gently. The bottle was capped and allowed to stand undisturbed for 24 hours, at which time it was gently swirled again and the urea dissolved in the water was determined from the refractive index of the solution. The dissolved urea was determined again after 4 days and after 7 days. The results reported as percent WIN, obtained from subtracting the dissolved portion from the added portion to determine the remaining portion, were as follows:

| Wax Coating | Dust | Wax Deposit | % WIN in 7 days Not Abraded | Abraded |
| --- | --- | --- | --- | --- |
| Example 1 | Slight | None | 83 | 60 |
| Example 2A | Slight | None | 81 | 70 |
| Example 2C | Slight | Moderate | 90 | 83 |
| Example 2D | Slight | Moderate | 91 | 64 |
| Gulftene C30+ | Heavy | Heavy | 83 | 63 |
| Paraffin, mp 65C | Moderate | Heavy | 81 | 68 |
| None | Heavy | — | 36 | 25 |
| Comparative Example 3 | None | None | 71 | 60 |

EXAMPLE 5

A coating drum, sixteen inches in diameter and eight inches deep and equipped with lifter bars or flights every 6 inches, was charged with 1 Kg of potassium sulfate granules. The potassium sulfate was an International Minerals and Chemical Corporation (IMC) granular material, USA Sieve Series −5+8 (95%), size guide number (SGN) 275, $K_2O$ content: 50%. The drum was rotated at 20 rpm as the granules were heated to 80° C. Molten sulfur was applied to the potassium sulfate granules with a gear pump as an internally air atomized spray with 15 psi of atomized air preheated to approximately 150° C. The air atomized sulfur spray was applied at the rate of approximately 45 grams per minute until 243.6 g of sulfur had been applied to the granules in order to produce test samples of sulfur coated potassium sulfate granules having 19% coating weights.

Half of the samples thus produced were set aside for testing. The other half of the samples were returned one at a time to the coating drum for application of a polymer coating thereover having a coating weight of 3%. The polymer coating was performed by reheating the returned sulfur coated samples in the coating drum to 60° C. while tumbling at 20 rpm. A 38.5 g quantity of molten polymer (125°–150° C.) was poured onto the rotating sulfur coated granules. The composition of the polymer was 75% Chevron Gulftene C30+ alpha olefin wax and 25% DuPont Elvax 420 (copolymer of ethylene and 18% vinyl acetate). The temperature of the composition was maintained at 65°–70° C. for 3 minutes with a heat gun if needed. The resulting topcoated product was cooled in the drum to 60° C. and in a fluid bed to 30° C. The cooled product was screened −5+10 (USA Sieve Series).

Sulfur coated potassium sulfate samples thus produced, both with and without polymer topcoat, were tested directly for controlled release properties or, after simulated handling, by dropping 20 feet into a steel beaker. The controlled release test was a differential dissolution rate (DDR) determination wherein a 25 g product sample was placed in 150 ml of distilled water at room temperature. At each time interval, all water was removed and replaced with fresh by pouring the water out through a screen. A 5 ml aliquot of the decanted wash was treated with urease. Ammonia released was titrated with 0.1N HCl. Nitrogen found was expressed as a cumulative percentage of the total nitrogen of the product released in that time interval.

The results of this testing are set forth in the following table wherein each result is the average of 3 replications:

| Substrate | | | Sulfur | Polymer | Not Dropped (−) | DDR | Values |
|---|---|---|---|---|---|---|---|
| Granule | Size | N-P-K | Coating Wt | Coating Wt | or Dropped (+) | 1 Hr | 7 Days |
| $K_2SO_4$ | −6 + 10 | 0-0-50 | 19 | 3 | − | 0.7 | 14 |
| " | " | " | 19 | 3 | + | 0.3 | 23 |
| " | " | " | 19 | 0 | − | 0.8 | 45 |
| " | " | " | 19 | 0 | + | 4 | 63 |

Concerning the tabulated results, it should be noted that at both one hour and seven days, the polymer topcoat provided slow release properties well beyond that of the sulfur coated potassium sulfate substrate without a topcoating.

Thus, the tabulated results demonstrated that the polymer topcoat provides a product with good controlled release properties and improved durability as opposed to a sulfur only coating.

EXAMPLE 6

Monoammonium phosphate (MAP) was coated with sulfur to produce test sample and then half of these samples were topcoated with the same polymer utilizing the same equipment and production conditions as employed in Example 5. The MAP granular substrate material was supplied by Cargill Corporation and was a 10-50-0 granular, 95% −5+8, SGN 275.

The coated product was screened −5+8. It was tested before and after handling for differential dissolution rate (DDR) by the procedure of Example 5. The results of this testing were as follows:

| Substrate | | | Sulfur | Polymer | Not Dropped (−) | DDR | Values |
|---|---|---|---|---|---|---|---|
| Granule | Size | N-P-K | Coating Wt | Coating Wt | or Dropped (+) | 1 Hr | 7 Days |
| MAP | −5 + 8 | 10-50-0 | 19 | 3 | − | 1 | 40 |
| " | " | " | 19 | 3 | + | 3 | 59 |
| " | " | " | 19 | 0 | − | 8 | 85 |
| " | " | " | 19 | 0 | + | 11 | 90 |

It should be noted from the tabulated results that the polymer topcoat provides a product with good controlled release properties and improved durability as opposed to a sulfur only coating.

EXAMPLE 7

The physical properties of the products of Examples 5 and 6 with sulfur only coated substrates and sulfur plus polymer topcoat coatings were compared. The results are recorded in the following table wherein the rating for abrasion resistance is based on dissolution rates before and after handling (dropping); the "Dust Free" analysis was an evaluation of dust on a hand thrust into the material; and the "Non-smearing" determination was based on coating adhering to a screen.

| | $K_2SO_4$ | | MAP | |
|---|---|---|---|---|
| Substrate Coating | S Only | S + Polymer | S Only | S + Polymer |
| Abrasion Resistance | — | Increased | — | Increased |
| Free Flowing | Yes | Yes | Yes | Yes |
| Dust Free | No | Yes | No | Yes |
| Controlled Release | Yes | Yes | No | Yes |
| Non-smearing | Yes | Yes | Yes | Yes |

EXAMPLE 8

Ammonium sulfate was coated with sulfur and then polymer under the conditions described in Example 5. The ammonium sulfate was BASF granular, particle size 95% −8+20, N content: 21%.

The coated product, screened −8+20, was a controlled release product with a durable coating. The product had a sulfur coating of 19% and a polymer coating of 3%. The product analysis was 16% N.

EXAMPLE 9

A magnesium oxide-magnesium sulfate granule was coated with sulfur and then polymer topcoated under the conditions described in Example 5. The magnesium oxide-magnesium sulfate employed was Martin Marietta "Crop Mag 36," particle size 95% −6+16.

The coated product, screened −6+16, was a controlled release product with a durable coating. The product had a sulfur coating of 19% and a polymer coating of 3%. The product analysis was 18% Mg.

EXAMPLE 10

Several groups of test samples were prepared employing various polymer topcoats applied over sulfur coated fertilizer substrates. The preparation of these groups of test samples and the results achieved therewith are set forth below.

A first group of test samples was produced by charging the coating drum of Example 5 with 750 g of Cominco granular urea, 95% −5+8 (U.S.A. Sieve Series), SGN 275. The drum was rotated at 20 rpm as the granules were heated to 80° C. Molten sulfur (150° C.) was supplied with a gear pump. An internally air atomized flat spray was provided by joining the molten sulfur with 150° C. air in the chamber of a Spraying Systems Co. ¼ spray set-up with 2050 SS fluid cap and 73328 SS air cap. The molten sulfur was applied at approximately 45 grams per minute until the sulfur accounted for 12% of the final product weight (total of 104.7 g sulfur).

Half of the sulfur coated samples were set aside for testing. The other samples were returned to the coating drum and preheated to 60° C. while tumbling at 20 rpm. A 17.4-g quantity of molten polymer (125°–150° C.; 2% of final product weight) was applied. The polymer blend was that of Example 1 containing 25% DuPont Elvax 420 (copolymer of ethylene and 18% vinyl acetate); 75% Chevron C30+ alpha olefin wax. Coating temperature was held at 65°–70° C. for 3 minutes. The product was air cooled in the drum to 60° C. and in a fluid bed to 30° C. The product was screened −5+8.

The sample sulfur coated urea, both with and without polymer topcoat was tested directly for its controlled release properties or was tested after simulated handling by dropping 20 feet into a steel beaker. The controlled release test was a differential dissolution rate (DDR). The results are tabulated below. Each result is the average of 3 replicates.

Another group of test samples was produced by applying a 12% sulfur coat (104.7 g sulfur) to 750 g of granular urea employing the same techniques and equipment described above. The SCU was returned to the coating drum and heated to 60° C. while tumbling at 20 rpm. A 17.4-g quantity of molten polymer (125°–150° C., 2% of final product weight) was applied. The polymer was a blend of 20% ethylene-ethyl acrylate copolymer (18% ethyl acrylate) produced by Union Carbide (DPDA 9169) and 80% Chevron C30+ alpha olefin wax. Coating temperature was maintained at 70°–80° C. for 3 minutes. The product was air cooled in the drum to 60° C. and in a fluid bed to 30° C. It was screened −5+8. Results of tests conducted utilizing these test samples are also set forth in the following table.

A final group of test samples was likewise produced employing the same techniques and equipment as above to apply a 12% sulfur coat (104.7 g sulfur) to 750 g of granular urea. Then the SCU was returned to the coating drum and heated to 60° C. while tumbling at 20 rpm. A 17.4-g quantity of molten polymer (125°–150° C., 2% of final product weight) was applied. The polymer was a blend of 50% ethylene-vinyl alcohol-vinyl acetate terpolymer (Allied-Signal Actol 70) and 50% Chevron C30+ alpha olefin wax. Coating temperature was maintained at 70°–80° C. for 3 minutes. The product was air cooled in the drum to 60° C. and in a fluid bed to 30° C. The product was screened −5+8. Results of tests of controlled release properties conducted on these samples are tabulated in the following table.

| Polymer Coating Material | % Polymer in Blend | Not Dropped − Dropped 20' + | DDR Values 1 Hr | 7 Day | Δ 1 Hr |
|---|---|---|---|---|---|
| Ethylene-vinyl acetate copolymer (Elvax 420) | 25 " | − + | 7 14 | 42 49 | 7 |
| Ethylene-ethyl acrylate copolymer (DPDA 9169) | 20 " | − + | 11 24 | 57 64 | 13 |
| Ethylene-vinyl alcohol-vinyl acetate terpolymer (Actol 70) | 50 " | − + | 11 24 | 46 62 | 13 |
| None (12% Sulfur Coat Only) | — — | − + | 66 80 | 100 100 | 14 |

In regard to the tabulated results, it should be noted that all of the listed products are effective controlled release fertilizers except for the sulfur only case (100% release in 7 days). Loss of controlled release properties on handling is represented in the increase in 1 hr DDR value (Δ1 Hr). This value is similar for all of the tested products. However, the Δ1 Hr value for the sulfur coated products without a polymer topcoat would probably have been much greater if the 1 Hr DDR of the undropped sample was less than 66. Starting from a 1 Hr DDR of 66, the SCU only product has "much less to break" than the other materials in the table with 1 Hr DDR values around 10. Therefore, the tabulated data shows that with a polymer topcoated, sulfur coated fertilizer product both controlled release characteristics and durability were achieved.

Although the invention has been described in its preferred forms with a certain degree of particularity, it is to be understood that the present disclosure has been made by way of example only. Numerous changes in the details of the compositions and in the operational steps of the methods and in the materials utilized therein will be apparent without departing from the spirit and scope of the invention, as defined in the appended claims.

We claim:

1. An abrasion resistant, free-flowing, non-smearing, essentially dustless slow release fertilizer composition consisting essentially of:

a particulate water soluble fertilizer core having a sulfur coating layer applied directly onto the surface of said fertilizer core, said sulfur coating layer being coated with from about 0.75 to about 10 percent (by weight of the fertilizer composition) of a topcoating composition which is essentially non-flowable at ambient temperature and has a melting point of from about 60° C. to about 105° C., said topcoating composition providing a hard, outer coating over said sulfur coating layer and being non-smearing at ambient temperature whereby said sulfur coated fertilizer composition is rendered essentially dust-free on handling, said topcoating composition comprising a mixture of about 5 to about 50 percent (by weight of the topcoating composition) of a polymer and about 95 to about 50 percent (by weight of the topcoating composition) of a hydrocarbon wax;

said polymer being selected from the group consisting of ethylene-vinyl acetate copolymers; ethylene-acrylic acid copolymers; ethylene-ethyl acrylate copolymers; ethylene-vinyl alcohol copolymers; ethylene-vinyl alcohol-vinyl acetate terpolymers and mixtures thereof; and said hydrocarbon wax being selected from the group consisting of natural petroleum waxes having drop melting points between about 60° C. and 80° C., containing less than about 5% oil as determined by ASTM method D721, and being essentially free of aromatic or cyclic structures; synthetic hydrocarbon waxes melting between about 60° C. and 105° C., and having molecular weights between about 400 and 600 and mixtures thereof.

2. The composition of claim 1 wherein the hydrocarbon wax is a synthetic olefin mixture with an average molecular weight of greater than 400, and comprises essentially 0.5 to 2% paraffin. 30–40% hydrocarbons with vinylidine double bonds, 8–12% hydrocarbons with internal double bonds, and 50–55% hydrocarbons with alpha double bonds, and a drop melt point of about 69° to 75° C.

3. The composition of claim 1 wherein the hydrocarbon wax is a paraffin which contains less than 0.5% oil as determined by ASTM D/21, and has a drop melting point of about 60° to 70° C.

4. The composition of claim 1 wherein the polymer is an ethylene-vinyl acetate copolymer containing from about 10 to about 30% vinyl acetate.

5. The composition of claim 1 wherein the polymer is an ethylene-vinyl acetate copolymer having a weight ratio of ethylene to vinyl acetate of from about 20 to about 2 and the number molecular weight is from about 2000 to 20,000.

6. The composition of claim 1 wherein the polymer is an ethylene-acrylic acid copolymer having weight ratio of ethylene to acrylic acid of from about 50 to about 10 and the number molecular weight is from about 2000 to 20,000.

7. The composition of claim 1 wherein the particulate water soluble fertilizer core comprises ammonium sulfate, ammonium phosphate, urea, super-phosphate, dicalcium phosphate, basic calcium phosphate, potassium sulfate, potassium phosphate, potassium chloride magnesium oxide, magnesium sulfate and mixtures thereof.

8. A process for producing an abrasion resistant, free-flowing, non-smearing, essentially dustless slow release particulate fertilizer consisting essentially of:

providing a quantity of sulfur coated fertilizer particles having the sulfur applied directly onto the surface of said urea particles;

adding a metered stream of a topcoating composition to said fertilizer particles, either as a molten liquid or as pellets or prills less than 2 mm in diameter, at a temperature of from about 70° C. to about 100° C.;

said topcoating composition being essentially non-flowable at ambient temperatures and having a melting point of from about 60° C. to about 105° C., said topcoating composition comprising a mixture of about 5 to about 50 percent (by weight of the topcoating composition) of a polymer and about 95 to about 50 percent (by weight of the topcoating composition) of a hydrocarbon wax;

said polymer being selected from the group consisting of ethylene-vinyl acetate copolymers; ethylene-acrylic acid copolymers; ethylene-ethyl acrylate copolymers; ethylene-vinyl alcohol copolymers, ethylene-vinyl alcohol-vinyl acetate terpolymers; and mixtures thereof;

said hydrocarbon wax being selected from the group consisting of natural petroleum waxes having drop melting points between about 60° C. and 80° C., containing less than about 5% oil as determined by ASTM method D721, and being essentially free of aromatic or cyclic structures; synthetic hydrocarbon waxes melting between about 60° C. and 105° C., and having molecular weights between about 400 and 600 and mixtures thereof;

agitating the mixture of topcoating composition and sulfur coated fertilizer particles in a manner such that a mixing of said mixture is achieved; and cooling the mixture with agitation to ambient temperature to provide a fertilizer having a hard outer coating applied over said sulfur coating layer which is non-smearing at ambient temperature and said fertilizer is essentially dust-free on handling.

9. The process of claim 8 wherein the hydrocarbon wax is a synthetic olefin mixture with an average molecular weight of greater than 400, and comprises essentially 0.5 to 2% paraffin. 30–40% hydrocarbons with vinyldine double bonds, 8–12% hydrocarbons with internal double bonds, and 50–55% hydrocarbons with alpha double bonds, and a drop melt point of about 69° to 75° C.

10. The process of claim 8 wherein the hydrocarbon wax is a paraffin which contains less than 0.5% oil as determined by ASTM D/21, and has a drop melting point of about 60° to 70° C.

11. The process of claim 8 wherein the polymer is an ethylene-vinyl acetate copolymer containing from about 10 to about 30% vinyl acetate.

12. The process of claim 8 wherein the polymer is an ethylene-vinyl acetate copolymer having a weight ratio of ethylene to vinyl acetate of from about 20 to about 2 and the number molecular weight is from about 2000 to 20,000.

13. The process of claim 8 wherein the polymer is an ethylene-acrylic acid copolymer having weight ratio of ethylene to acrylic acid of from about 50 to about 10 and the number molecular weight is from about 2000 to 20,000.

14. The process of claim 8 wherein the particulate water soluble fertilizer core comprises ammonium sulfate, ammonium phosphate, urea, super-phosphate, dicalcium phosphate, basic calcium phosphate, potassium sulfate, potassium phosphate, potassium chloride, magnesium oxide, magnesium sulfate and mixtures thereof.

* * * * *

UNITED STATES PATENT AND TRADEMARK OFFICE
CERTIFICATE OF CORRECTION

PATENT NO. : 5,466,274
DATED : Nov. 14, 1995
INVENTOR(S) : Alice P. Hudson, et al It is certified that error appears in the above-indentified patent and that said Letters Patent is hereby corrected as shown below:

```
Column  6, Line 31, change "and tile" to --and the--.
Column 11, Line 11, "¼ spray" should be --¼ J spray--.
```

Signed and Sealed this

Eighteenth Day of June, 1996

*Attest:*

BRUCE LEHMAN

*Attesting Officer*  *Commissioner of Patents and Trademarks*